(12) United States Patent
Kwon et al.

(10) Patent No.: US 11,578,509 B2
(45) Date of Patent: Feb. 14, 2023

(54) OUTSIDE DOOR HANDLE ASSEMBLY FOR VEHICLE

(71) Applicants: Hyundai Motor Company, Seoul (KR); Kia Motors Corporation, Seoul (KR)

(72) Inventors: Soonchan Kwon, Incheon (KR); Jungmin Jo, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 174 days.

(21) Appl. No.: 16/844,190

(22) Filed: Apr. 9, 2020

(65) Prior Publication Data

US 2021/0180368 A1    Jun. 17, 2021

(30) Foreign Application Priority Data

Dec. 16, 2019  (KR) .................. 10-2019-0167418

(51) Int. Cl.
| | | |
|---|---|---|
| E05B 77/06 | (2014.01) | |
| E05B 85/16 | (2014.01) | |
| B60J 5/04 | (2006.01) | |

(52) U.S. Cl.
CPC ............. *E05B 77/06* (2013.01); *B60J 5/0468* (2013.01); *E05B 85/16* (2013.01); *E05Y 2900/531* (2013.01)

(58) Field of Classification Search
CPC .......... E05B 77/02; E05B 77/04; E05B 77/06; E05B 85/10; E05B 85/14; E05B 85/16; E05B 85/18; E05B 79/06; Y10T 292/57; Y10S 292/22; Y10S 292/65
See application file for complete search history.

(56) References Cited

U.S. PATENT DOCUMENTS

| | | | |
|---|---|---|---|
| 10,907,388 B2 * | 2/2021 | Miller | .................. E05B 85/16 |
| 2016/0130845 A1 | 5/2016 | Park | |
| 2017/0370131 A1 | 12/2017 | Ono et al. | |
| 2020/0190866 A1 * | 6/2020 | Guerin | ................. E05B 85/103 |
| 2020/0277811 A1 * | 9/2020 | Yamada | ................. B60J 5/0468 |
| 2020/0386019 A1 * | 12/2020 | Jeong | ..................... E05B 77/04 |
| 2021/0156179 A1 * | 5/2021 | Savant | .................. E05B 85/16 |

FOREIGN PATENT DOCUMENTS

| | | | | |
|---|---|---|---|---|
| CN | 104895428 A | 9/2015 | | |
| CN | 106150236 A | 11/2016 | | |
| CN | 107429530 A | 12/2017 | | |
| CN | 108222709 A | * 6/2018 | ............. | E05B 77/04 |
| CN | 110226016 A | 9/2019 | | |
| IN | 201817008413 A1 | 6/2018 | | |
| JP | 2017031745 A | * 2/2017 | ............... | B60J 5/04 |
| WO | 2018118281 A1 | 6/2018 | | |
| WO | WO-2019038194 A1 | * 2/2019 | ............. | E05B 77/06 |
| WO | 2019201770 A1 | 10/2019 | | |

* cited by examiner

*Primary Examiner* — Kristina R Fulton
*Assistant Examiner* — Noah Horowitz
(74) *Attorney, Agent, or Firm* — Slater Matsil, LLP

(57) ABSTRACT

An outside door handle assembly for a vehicle includes a grip cover, a grip body that is provided hinge-rotatable outward in a width direction of the vehicle in an outer panel of a vehicle door, and is engaged with the grip cover, and a balance weight that is included in the grip body to be hinge-rotatable in an opposite direction of a hinge-rotation direction of the grip body with respect to a hinge rotation point on an extension line of the grip body.

20 Claims, 10 Drawing Sheets

OUTSIDE DOOR HANDLE ASSEMBLY FOR VEHICLE

CROSS-REFERENCE TO RELATED APPLICATIONS

This application claims priority to Korean Patent Application No. 10-2019-0167418, filed in the Korean Intellectual Property Office on Dec. 16, 2019, which application is hereby incorporated herein by reference.

TECHNICAL FIELD

The present invention relates to an outside door handle assembly for a vehicle.

BACKGROUND

In general, an outside door handle assembly for a vehicle is provided in a door outer panel, and thus when a user grips the outside door handle and pulls outward in a width direction of the vehicle to open the door, one side of the outside door handle rotates outside in the width direction of the vehicle while the other side of the outside door handle is supported by the door outer panel such that a door latch rod or a cable connected to the outside door handle is pulled and thus a door latch is released, thereby opening the door locked on the vehicle body.

A conventional outside door handle assembly for a vehicle includes an outside door handle provided to protrude outward in a width direction of the vehicle of a door outer panel for easy operation by a user, a base structure that is provided for installation of the outside door handle in a door outer panel, and a balance weight or a blocking lever that is connected with the outside door handle so as not to forcibly rotate by an impact force of the outside door handle, which occurs when a side collision accident occurs.

However, such a conventional outside door handle assembly requires a structure such as an additional base to install the outside door handle in the door outer panel, thereby increasing the number of parts of the vehicle, the weight, and the production cost of the vehicle, and it is not easy to install the outside door handle in an assembly hole formed in the door outer panel.

Meanwhile, in order to solve such a problem, a conventional outside door handle assembly in which a base structure is integrally formed or combined with the outside door handle without a separate base structure has been proposed, but a parting line is formed in the outside door handle, thereby deteriorating an external appearance, and since a cover part and functional parts are unified, a coating/plating area is exposed to the outside and thus only a coating/plating material can be used.

The above information disclosed in this background section is only for enhancement of understanding of the background of the invention and therefore it may contain information that does not form the prior art that is already known to a person of ordinary skill in the art.

SUMMARY

The present invention relates to an outside door handle assembly for a vehicle. Particular embodiments relate to an outside door handle assembly for a vehicle that is rotatably installed at an outer side of a door outer panel in a width direction of the vehicle.

Embodiments of the present invention provide an outside door handle assembly for a vehicle which can reduce the number of parts, the weight, and the cost of the vehicle, improve the external appearance, and improve safety of a passenger by preventing the vehicle door from being opened in the event of a side collision of the vehicle.

An outside door handle assembly for a vehicle according to an exemplary embodiment of the present invention includes a grip cover, a grip body that is provided hinge-rotatable outward in a width direction of the vehicle in an outer panel of a vehicle door, and is engaged with the grip cover, and a balance weight that is included in the grip body to be hinge-rotatable in the opposite direction of the hinge-rotation direction of the grip body with respect to a hinge rotation point on an extension line of the grip body.

A hinge bracket may be coupled to the door outer panel, and one side of the grip body may be engaged to the hinge bracket through a hinge pin.

The hinge bracket may include one or more guide pins inserted while penetrating the door outer panel, and one or more hooks engaged or coupled to the door outer panel.

The grip body may be provided with a hinge arm that is engaged to the hinge bracket by the hinge pin.

An operation arm provided with an insertion hole may be provided in the opposite side of the hinge arm along a length direction of the grip body.

A support bracket may be engaged in a fixed manner to the door outer panel.

A release lever may be provided to be rotatable through a pin in the support bracket, and a return spring may be provided to return the release lever.

The release lever may include a first arm connected with the operation arm by being inserted into the insertion hole of the operation arm, and a second arm connected with one side of a door latch release rod of which the other side is connected with a door latch.

A blocking lever that protrudes toward the release lever by an inertial force and stops rotation of the release lever may be rotatably engaged to the support bracket.

The blocking lever may be provided with a hooking protrusion that protrudes toward the release lever, and the release lever may be provided with a hooking groove into which the hooking protrusion of the blocking lever is inserted and hooked.

The hooking groove may be formed to have a recess shape on one side of the second arm of the release lever.

The hooking groove may be formed in the shape of "⊏" with one opened side wall.

The hooking groove may include a first side wall that forms an opened inlet, a second side wall that is provided on the opposite side of the first side wall while forming the inlet, and has a curved shape that expands the inlet, and a third side wall that connects the first side wall and the second side wall, where the hooking protrusion is hooked, and is disposed to oppose the inlet.

The outside door handle assembly for the vehicle according to the exemplary embodiments of the present invention does not need a separate base structure for installing an outside door handle in a door outer panel so that the number of parts, the weight, and the production cost of the vehicle can be reduced.

In addition, no parting line is formed in a grip portion of the outside door, and thus an external appearance of the outside door handle can be improved, and the cover part and the functional part are dualized and thus the cover portion of which the coating/plating area is exposed to the outside may be formed by using a coating/plating material, and the functional part may be formed by using a rigid material.

Further, the blocking lever or the balance weight can stably operate in the event of a side collision accident of the vehicle so that the door of the vehicle can be prevented from being opened, thereby improving safety of a passenger with respect to the collision accident of the vehicle.

BRIEF DESCRIPTION OF THE DRAWINGS

The drawings are intended to be used as references for describing the exemplary embodiments of the present invention, and the accompanying drawings should not be construed as limiting the technical spirit of the present invention.

DETAILED DESCRIPTION OF ILLUSTRATIVE EMBODIMENTS

Figure 1:
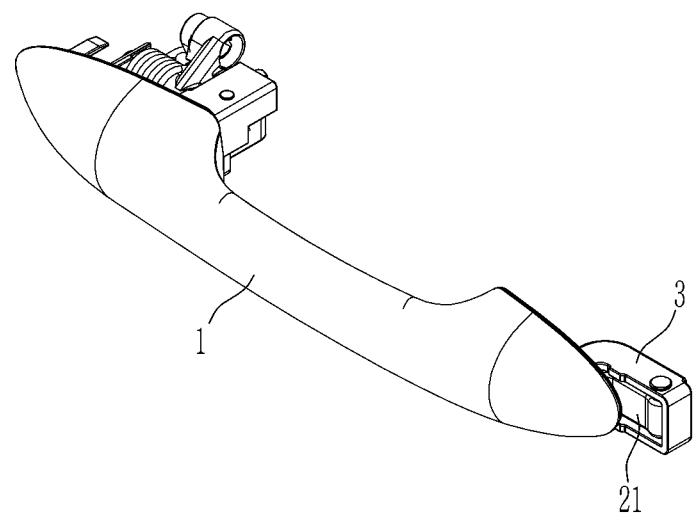
FIG. 1 is a perspective view of an outside door handle assembly for a vehicle according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

Because the size and thickness of each configuration shown in the drawings are arbitrarily shown for better understanding and ease of description, the present invention is not limited thereto, and the thicknesses of portions and regions are exaggerated for clarity.

Further, in the following detailed description, names of constituent elements, which are in the same relationship, are divided into "the first", "the second", etc., but the present invention is not necessarily limited to the order in the following description.

In addition, unless explicitly described to the contrary, the word "comprise" and variations such as "comprises" or "comprising" will be understood to imply the inclusion of stated elements but not the exclusion of any other elements.

Figure 2:
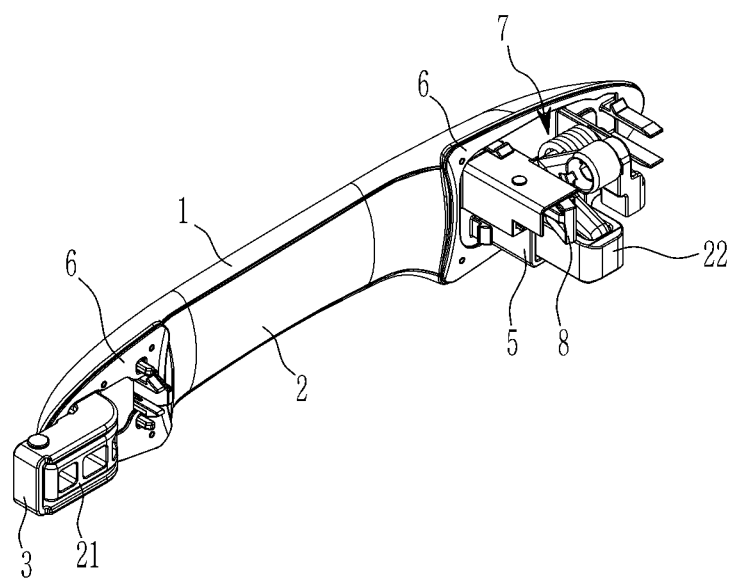
FIG. 2 is a perspective view of a rear side of the outside door handle assembly for the vehicle according to the exemplary embodiment of the present invention.
Figure 3:
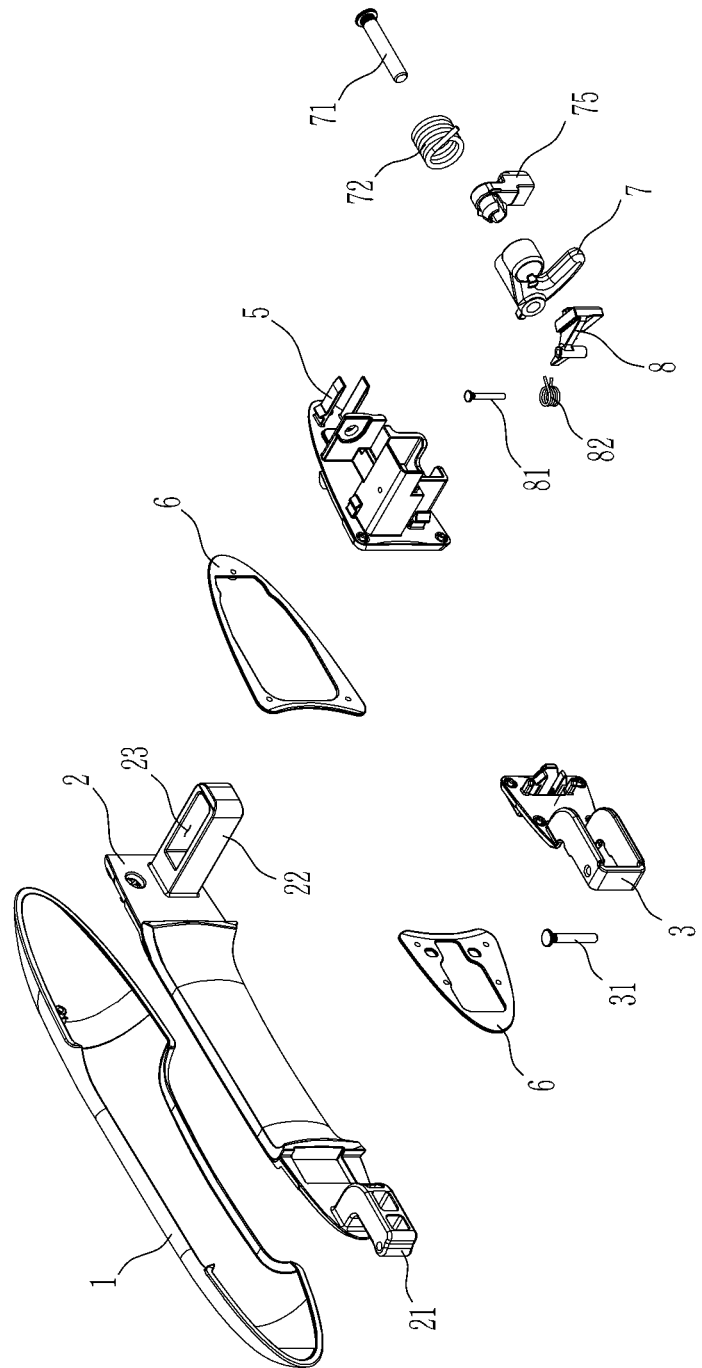
FIG. 3 is an exploded perspective view of the outside door handle assembly for the vehicle according to the exemplary embodiment of the present invention.

Referring to FIG. 1 to FIG. 3, an outside door handle assembly for a vehicle according to an exemplary embodiment of the present invention may include a grip cover 1 formed in a shape that can be easily held by a user, and a grip body 2 that is engaged to the grip cover 1 to support the grip cover 1.

A hinge arm 21 that further extends in a length direction of the grip body 2 is provided at one side of the grip body 2, and an operation arm 22 that protrudes perpendicular to the grip body 2 may be provided at the other side of the grip body 2.

An insertion hole 23 to which one side of a release lever, which will be described later, is inserted may be provided in the operation arm 22.

The hinge arm 21 is rotatably engaged to a hinge bracket 3 through a hinge pin 31, and the hinge bracket 3 may be directly engaged to or detachably coupled to the door outer panel.

Figure 4:
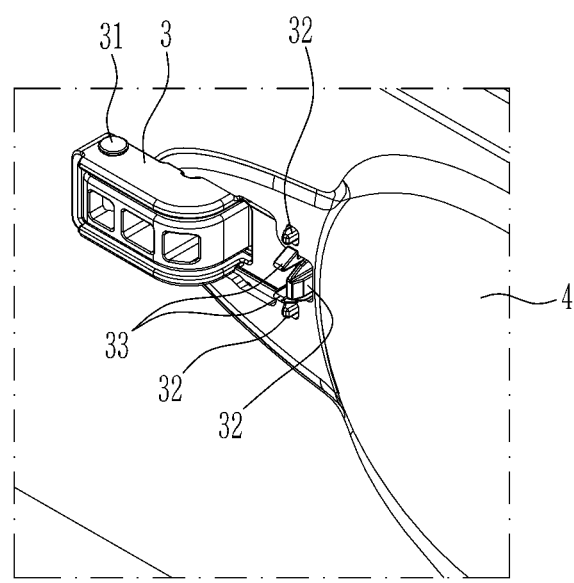
FIG. 4 shows a state in which one side of the outside door handle assembly according to the exemplary embodiment of the present invention is mounted to a door outer panel.

As shown in FIG. 4, the hinge bracket 3 is provided with three guide pins 32 and two hooks 33 such that an engagement hole where the hinge bracket 3 may be engaged by being inserted thereinto, guide pins disposed at the periphery of the engagement hole and into which the three guide pins 32 are inserted, and hooking grooves where the two hooks 33 are hooked may be respectively formed in a door outer panel 4.

Figure 5:
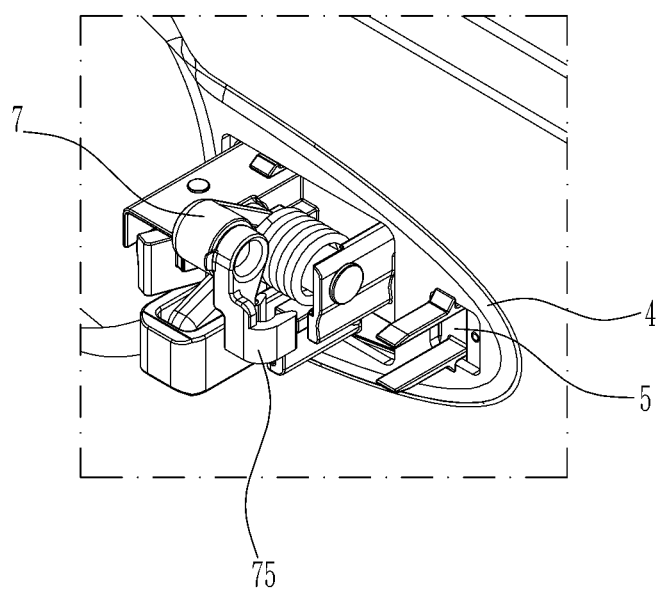
FIG. 5 shows a state in which the other side of the outside door handle assembly according to the exemplary embodiment of the present invention is mounted to the door outer panel.

A support bracket 5 is disposed at the opposite side of the hinge bracket 3 in the length direction of the grip body 2, and thus, as shown in FIG. 5, the support bracket 5 may be engaged to the door outer panel 4 by a bolt.

The support bracket 5 is provided with an insert nut, and the bolt is inserted into the insert nut such that the support bracket 5 can be engaged to the door outer panel 4.

The support bracket 5 and the hinge bracket 3 may be closely attached to the door outer panel 4 by disposing pads 6 respectively therebetween.

A release lever 7 is rotatably provided in the support bracket 5 through a pin 71, and a return spring 72 that returns the release lever 7 is wound around the pin 71.

Figure 6:
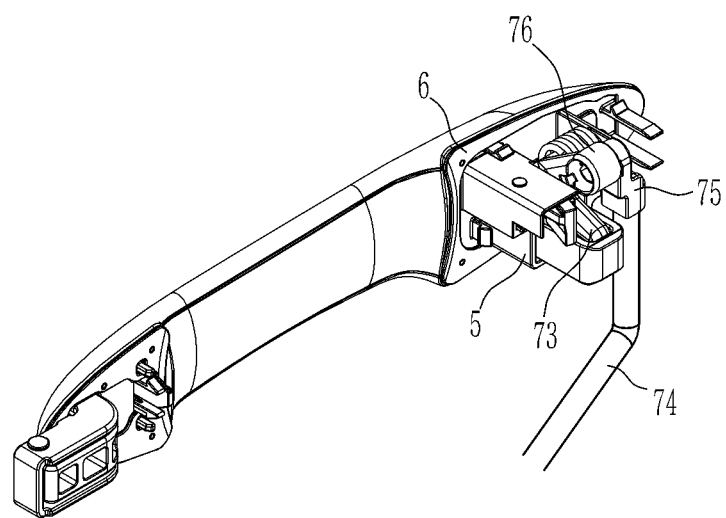
FIG. 6 shows a setting state before the outside door handle assembly for the vehicle according to the exemplary embodiment of the present invention is operated by a user.
Figure 7:
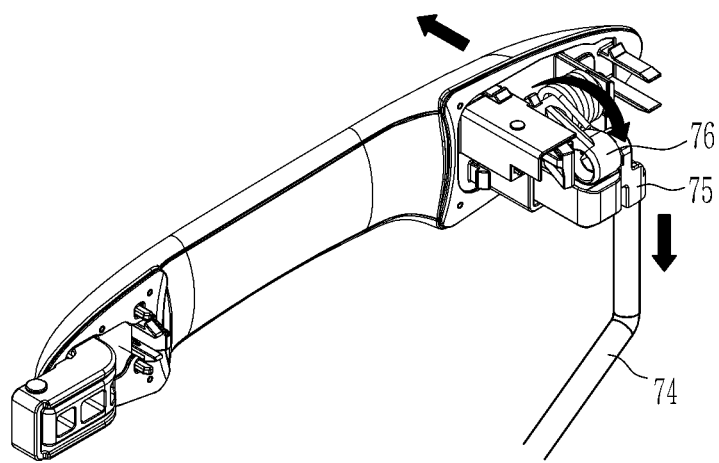
FIG. 7 shows a state in which the outside door handle assembly for the vehicle according to the exemplary embodiment of the present invention is operated by the user.

As shown in FIG. 6, the release lever 7 may be provided with a first arm 73 that is connected with the operation arm 22 by being inserted into an insertion hole 23 of the operation arm 22, and a second arm 76 that is connected with one side of a door latch release rod 74 of which the other end is connected to the door latch, through a connection pin 75.

Accordingly, in a state that the grip cover 1 of FIG. 6 is not operated by the user, when the user pulls the grip cover 1 and thus the grip cover 1 and the grip body 2 are pulled outward in the width direction of the vehicle, the first arm 73 of the release lever 7 inserted into the insertion hole 23 of the grip body 2 rotates around the pin 71 by the grip body 2, and the second arm 76 rotates together such that the door latch release rod 74 is pushed to release the door latch, and accordingly the door locked to the vehicle body can be opened.

Figure 8:
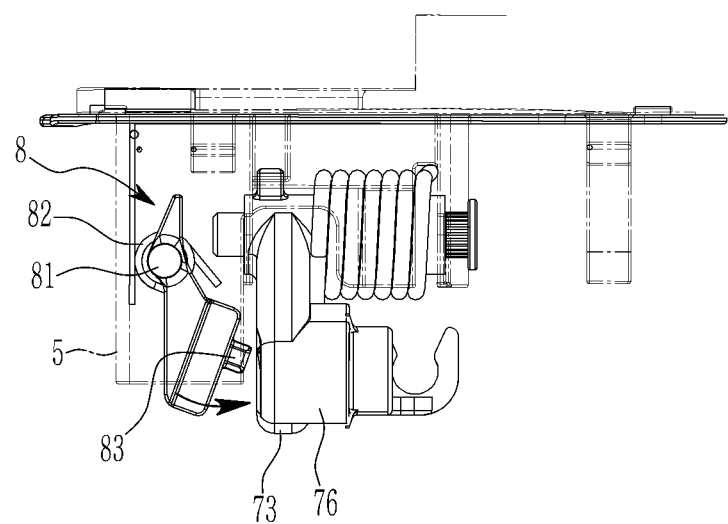
FIG. 8 is a top plan view of a blocking lever of the outside door handle assembly for the vehicle according to the exemplary embodiment of the present invention.

As shown in FIG. 8, a blocking lever 8 may be rotatably engaged to the support bracket 5 through a pin 81, and a return spring 82 may be provided in the support bracket 5 to return the blocking lever 8.

A hooking protrusion 83 may be provided to protrude toward the release lever 7 in the blocking lever 8.

Figure 9:
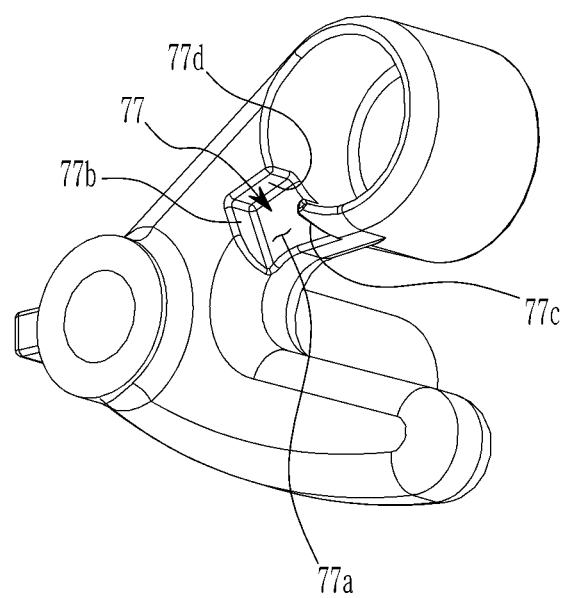
FIG. 9 is a perspective view of a release lever of the outside door handle assembly for the vehicle according to the exemplary embodiment of the present invention.

In addition, as shown in FIG. 9, a hooking groove 77 into which the hooking protrusion 83 of the blocking lever 8 is inserted to stop rotation of the release lever 7 may be provided in the release lever 7.

The hooking groove 77 may be formed to have a recessed shape on one side of the second arm 76 of the release lever 7. The hooking groove 77 may be formed in the shape of "⊏" with one opened side wall. In the hooking groove 77, a first side wall 77b that forms an opened inlet 77a is substantially perpendicular, a second side wall 77c, which is the other side of the side that forms the inlet 77a, is a curved wall to expand the inlet 77a, and a third side wall 77d that connects the first side wall 77b and the second side wall 77c may be disposed to oppose the inlet 77a.

When an inertia force is applied to the blocking lever 8 by a side impact of the vehicle and thus the blocking lever 8 rotates counterclockwise, the hooking protrusion 83 enters the rotational track of the release lever 7 and is inserted into the hooking groove 83 and locked to the third side wall 77d such that rotation of the release lever 7 is prevented by the hooking protrusion 83, thereby preventing the door from being opened.

Although the release lever 7 rotates quickly due to spring scattering or the like, the second side wall 77c formed in the curved wall may act as blocking the release lever 7 so that the blocking lever 8 smoothly enters the hooking groove 77.

Figure 10:
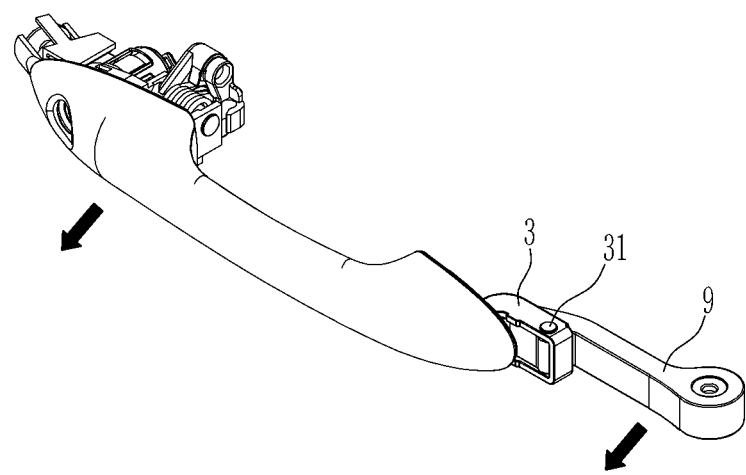
FIG. 10 is a perspective view of an outside door handle assembly for a vehicle according to another exemplary embodiment of the present invention.

Meanwhile, referring to FIG. 10, a balance weight 9 may be engaged to the grip body 2 on an extension line of the grip body 2. The balance weight 9 may be rotatably provided through the hinge pin 31.

The balance weight 9 may be provided instead of the blocking lever 8, or may be provided together with the blocking lever 8.

As described, when a side collision accident occurs in a vehicle provided with the balance weight 9 and thus the grip body 2 tends to protrude while rotating outward in the width direction of the vehicle with respect to the hinge pin 31 by the inertial force, the balance weight 9 also receives the inertial force such that it limits the rotation of the grip body 2 while rotating outward in the width direction of the vehicle such that the door can be prevented from being opened by the inertial rotation of the outside door handle due to the side collision accident, thereby improving safety of a passenger.

While this invention has been described in connection with what is presently considered to be practical exemplary embodiments, it is to be understood that technical aspects of the present invention are not limited to the exemplary embodiments suggested in the specification, but, although a person of ordinary skill in this field of art who understands the technical aspects of the present invention can suggest another exemplary embodiment by modifications, changes, removal, and addition of constituent elements within a range of technical aspects that are the same as in the present invention, it will also be within a range of rights of the present invention.

What is claimed is:

1. An outside door handle assembly for a vehicle, comprising:
   a grip cover;
   a grip body that is provided hinge-rotatable outward in a width direction of the vehicle in an outer panel of a vehicle door, and is engaged with the grip cover;
   a balance weight that is included in the grip body to be hinge-rotatable in an opposite direction of a hinge-rotation direction of the grip body with respect to a hinge rotation point on an extension line of the grip body;
   a support bracket engaged in a fixed manner to the outer panel;
   a release lever provided to be rotatable through a pin in the support bracket; and
   a blocking lever rotatably engaged to the support bracket, wherein the blocking lever is configured to protrude toward the release lever by an inertial force and to stop rotation of the release lever and wherein the blocking lever includes:
      a hooking protrusion that protrudes toward the release lever; and
      the release lever includes a hooking groove into which the hooking protrusion of the blocking lever is inserted and hooked;
   wherein the hooking groove comprises:
      a first side wall that forms an opened inlet;
      a second side wall that is provided on an opposite side of the first side wall while forming the inlet, and has a curved shape that expands the inlet; and
      a third side wall that connects the first side wall and the second side wall, where the hooking protrusion is hooked, and is disposed to oppose the inlet.

2. The outside door handle assembly for the vehicle of claim 1, further comprising a hinge bracket coupled to the outer panel, wherein one side of the grip body is engaged to the hinge bracket through a hinge pin.

3. The outside door handle assembly for the vehicle of claim 2, wherein the hinge bracket comprises:
   one or more guide pins inserted while penetrating the outer panel; and
   one or more hooks engaged or coupled to the outer panel.

4. The outside door handle assembly for the vehicle of claim 2, wherein the grip body comprises a hinge arm that is engaged to the hinge bracket by the hinge pin.

5. The outside door handle assembly for the vehicle of claim 4, further comprising an operation arm having an insertion hole, wherein the operation arm is provided on an opposite side of the grip body from the hinge arm along a length direction of the grip body.

6. The outside door handle assembly for the vehicle of claim 5, further comprising a return spring provided to return the release lever.

7. The outside door handle assembly for the vehicle of claim 6, wherein the release lever comprises:
   a first arm connected with the operation arm by being inserted into the insertion hole of the operation arm; and
   a second arm connected with a first side of a door latch release rod of which a second side is connected with a door latch.

8. The outside door handle assembly for the vehicle of claim 7, wherein the hooking groove is formed to have a recess shape on one side of the second arm of the release lever.

9. The outside door handle assembly of claim 8, wherein the hooking groove is formed in a "U"-shape with one opened side wall.

10. An outside door handle assembly for a vehicle, comprising:

a grip cover;
a grip body that is provided hinge-rotatable outward in a width direction of the vehicle in an outer panel of a vehicle door, and is engaged with the grip cover;
a balance weight that is included in the grip body to be hinge-rotatable in an opposite direction of a hinge-rotation direction of the grip body with respect to a hinge rotation point on an extension line of the grip body;
a hinge bracket coupled to the outer panel, wherein one side of the grip body is engaged to the hinge bracket through a hinge pin, wherein the grip body comprises a hinge arm that is engaged to the hinge bracket by the hinge pin;
an operation arm having an insertion hole, wherein the operation arm is provided on an opposite side of the grip body from the hinge arm along a length direction of the grip body;
a support bracket engaged in a fixed manner to the outer panel;
a release lever provided to be rotatable through a pin in the support bracket, wherein the release lever comprises a first arm connected with the operation arm by being inserted into the insertion hole of the operation arm and a second arm connected with a first side of a door latch release rod of which a second side is connected with a door latch;
a return spring provided to return the release lever; and
a blocking lever rotatably engaged to the support bracket, wherein the blocking lever is configured to protrude toward the release lever by an inertial force and to stop rotation of the release lever;
wherein the blocking lever includes a hooking protrusion that protrudes toward the release lever;
wherein the release lever includes a hooking groove into which the hooking protrusion of the blocking lever is inserted and hooked;
wherein the hooking groove is formed to have a recess shape on one side of the second arm of the release lever;
wherein the hooking groove is formed in a "U" shape with one opened side wall; and
wherein the hooking groove comprises:
 a first side wall that forms an opened inlet;
 a second side wall that is provided on an opposite side of the first side wall while forming the inlet, and has a curved shape that expands the inlet; and
 a third side wall that connects the first side wall and the second side wall, where the hooking protrusion is hooked, and is disposed to oppose the inlet.

11. A vehicle comprising:
a vehicle body;
a vehicle door attached to the vehicle body, the vehicle door having an outer panel;
an outside door handle comprising a grip cover and a grip body engaged with the grip cover, wherein the grip body is hinge-rotatable outward in a width direction of the vehicle in the outer panel of the vehicle door;
a balance weight in the grip body, wherein the balance weight is hinge-rotatable in an opposite direction of a hinge-rotation direction of the grip body with respect to a hinge rotation point on an extension line of the grip body;
a support bracket engaged in a fixed manner to the outer panel of the vehicle door;
a release lever rotatable through a pin in the support bracket; and
a blocking lever rotatably engaged to the support bracket;
wherein the blocking lever is configured to protrude toward the release lever by an inertial force and to stop rotation of the release lever;
wherein the blocking lever includes a hooking protrusion that protrudes toward the release lever;
wherein the release lever includes a hooking groove into which the hooking protrusion of the blocking lever is inserted and hooked; and
wherein the hooking groove comprises:
 a first side wall that forms an opened inlet;
 a second side wall that is provided on an opposite side of the first side wall while forming the inlet, and has a curved shape that expands the inlet; and
 a third side wall that connects the first side wall and the second side wall, where the hooking protrusion is hooked, and is disposed to oppose the inlet.

12. The vehicle of claim 11, further comprising a hinge bracket coupled to the outer panel of the vehicle door, wherein one side of the grip body is engaged to the hinge bracket through a hinge pin.

13. The vehicle of claim 12, further comprising:
a hinge arm provided at a first side of the grip body, wherein the hinge arm is engaged to the hinge bracket by the hinge pin;
an operation arm provided at a second side of the grip body opposite the first side along a length direction of the grip body, wherein the operation arm includes an insertion hole; and
a return spring configured to return the release lever.

14. The vehicle of claim 13, wherein the release lever comprises:
a first arm connected with the operation arm by being inserted into the insertion hole of the operation arm; and
a second arm connected with a first side of a door latch release rod of which a second side is connected with a door latch.

15. The vehicle of claim 14, wherein:
the hooking groove is formed to have a recess shape on one side of the second arm of the release lever; and
the hooking groove is formed in a "U"-shape with one opened side wall.

16. The outside door handle assembly for the vehicle of claim 10, wherein the hinge bracket comprises one or more guide pins inserted while penetrating the outer panel.

17. The outside door handle assembly for the vehicle of claim 16, wherein the hinge bracket further comprises one or more hooks engaged or coupled to the outer panel.

18. The outside door handle assembly for the vehicle of claim 10, wherein the hinge bracket comprises one or more hooks engaged or coupled to the outer panel.

19. A vehicle comprising:
a vehicle body;
a vehicle door attached to the vehicle body, the vehicle door having an outer panel; and
the outside door handle assembly of claim 10 attached to the outer panel of the vehicle door.

20. The vehicle of claim 19, wherein the hinge bracket of the outside door handle assembly comprises:
one or more guide pins inserted while penetrating the outer panel; and
one or more hooks engaged or coupled to the outer panel.

* * * * *